(12) United States Patent  (10) Patent No.: US 7,832,305 B2
Mahendra et al.                (45) Date of Patent: Nov. 16, 2010

(54) ADJUSTABLE PEDAL SYSTEM WITH LOW BRAKE RATIO CHANGE

(75) Inventors: Akhil Mahendra, Rochester Hills, MI (US); Gordon Smith, Lake Orion, MI (US); Srini Sundaresan, Troy, MI (US)

(73) Assignee: Dura Global Technologies LLC, Rochester Hills, MI (US)

( * ) Notice: Subject to any disclaimer, the term of this patent is extended or adjusted under 35 U.S.C. 154(b) by 937 days.

(21) Appl. No.: 11/554,233

(22) Filed: Oct. 30, 2006

(65) Prior Publication Data

US 2007/0137396 A1    Jun. 21, 2007

Related U.S. Application Data

(60) Provisional application No. 60/731,979, filed on Oct. 31, 2005.

(51) Int. Cl.
    *G05G 1/14*    (2006.01)
(52) U.S. Cl. .................................. 74/512; 74/560
(58) Field of Classification Search ........... 74/512–514, 74/560, 518; 180/320, 334, 335
    See application file for complete search history.

(56) References Cited

U.S. PATENT DOCUMENTS

| | | | | |
|---|---|---|---|---|
| 6,151,986 A | * | 11/2000 | Willemsen et al. ............ | 74/512 |
| 6,321,617 B1 | * | 11/2001 | Schwyn ........................ | 74/512 |
| 6,584,871 B2 | * | 7/2003 | Burton et al. .................. | 74/512 |
| 7,146,876 B2 | * | 12/2006 | Willemsen et al. ............ | 74/512 |
| 7,219,576 B2 | * | 5/2007 | Leonard et al. ............... | 74/518 |
| 7,530,289 B2 | * | 5/2009 | Willemsen et al. ............ | 74/512 |
| 2009/0025505 A1 | * | 1/2009 | Booher et al. ................. | 74/512 |

* cited by examiner

*Primary Examiner*—Vinh T. Luong
(74) *Attorney, Agent, or Firm*—Porter Wright Morris & Arthur LLP; Richard M. Mescher; Dean B. Watson

(57) ABSTRACT

A control pedal assembly includes a first axle forming a first pivot axis and a first booster link pivotable about the first pivot axis. A control pedal has a second axle forming a second pivot axis, a pedal arm pivotable about the second pivot axis, and a pedal at a lower end of the pedal arm. A second booster link is pivotably connecting the pedal arm with the first booster link so that pivoting motion of the pedal arm about the second pivot axis pivots the booster link about the first pivot axis. A support member has a first end supporting the second axle on opposite sides of the pedal arm and the support member is pivotable about its second end. A drive assembly is operably connected to the control pedal to move the second axle in a fore-aft direction to adjust the control pedal in a fore-aft direction.

20 Claims, 6 Drawing Sheets

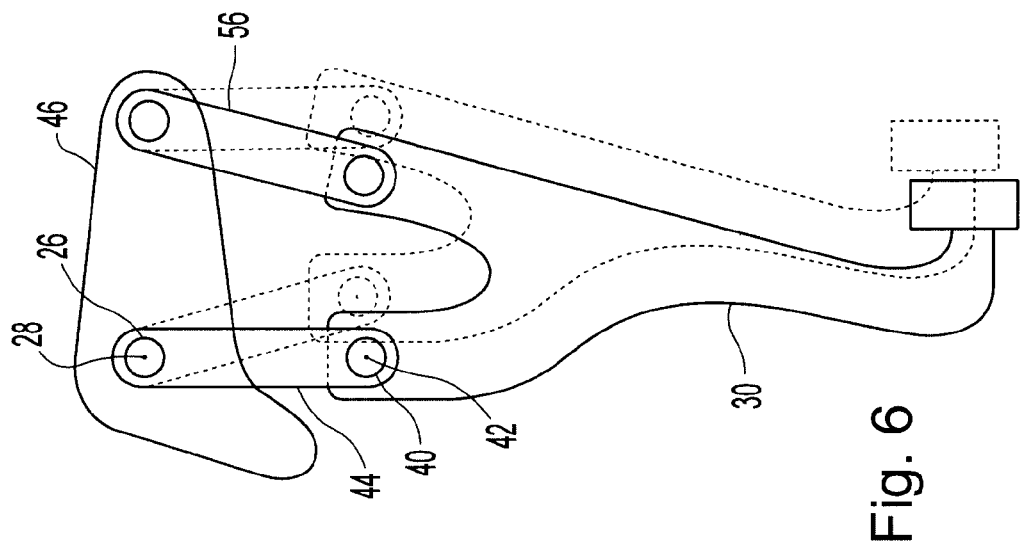
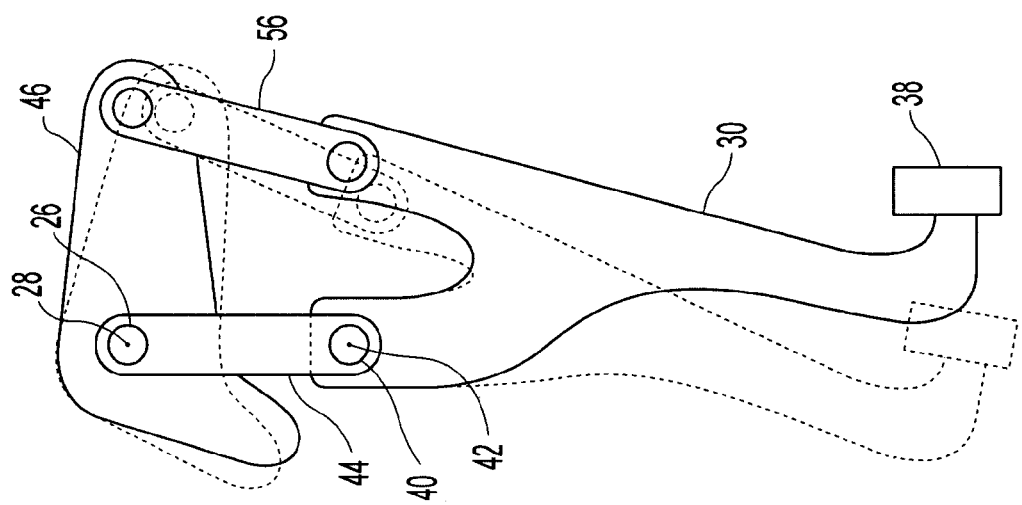

ADJUSTABLE PEDAL SYSTEM WITH LOW BRAKE RATIO CHANGE

CROSS-REFERENCE TO RELATED APPLICATIONS

This application claims the priority benefit of U.S. Provisional Patent Application No. 60/731,979 filed on Oct. 31, 2005, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to control pedals for motor vehicles and, more particularly, to control pedals which can be selectively adjusted to desired positions in a forward/rearward direction.

BACKGROUND OF THE INVENTION

Control pedals are typically provided in a motor vehicle, such as an automobile, which are foot operated by the driver. Separate control pedals are provided for operating vehicle brakes and an engine throttle. When the motor vehicle has a manual transmission, a third control pedal is provided for operating a transmission clutch. A front seat of the motor vehicle is typically mounted on tracks so that the seat is forwardly and rearwardly adjustable along the tracks to a plurality of positions so that the driver can adjust the seat to the most advantageous position for working a steering wheel, the control pedals on other control devices of the motor vehicle.

This adjustment method of moving the front seat along the tracks generally fills the need to accommodate drivers of various size, but it raises several concerns. First, this adjustment method still may not accommodate all drivers due to very wide differences in anatomical dimensions of drivers. Second, the resulting position of the seat may still be uncomfortable for some drivers. Therefore, it is desirable to have an additional or alternate adjustment method for accommodating drivers of various sizes.

Many proposals have been made to selectively adjust the position of the control pedals relative to the steering wheel and the front seat in order to accommodate drivers of various sizes. While each of these adjustable control pedals may adequately adjust the position of the control pedal to accommodate drivers of various sizes, these adjustable control pedals may have a different "feel" depending on their adjusted position. A brake pedal's feel is typically defined by its brake ratio which is the ratio of the force input to the brake booster by the pedal assembly to the force input to the pedal assembly by the operator. Preferably, the brake ratio is substantially constant throughout the forward/rearward adjustment so that the brake pedal maintains its desired feel throughout the range of adjustment. Additionally, these adjustable control pedals may be noisy to operate due to dragging flex cables and the like. Furthermore, many of these adjustable control pedals are not easily customized to meet varying vehicle or floor pan requirements. Accordingly, there is a need in the art for an improved adjustable control pedal assembly which selectively adjusts the position of the pedal to accommodate drivers of various sizes.

SUMMARY OF THE INVENTION

The present invention provides an adjustable control pedal assembly which overcomes at least some of the above-noted problems of the related art. According to the present invention, a control pedal assembly comprises, in combination, a first axle forming a first pivot axis and a booster link pivotable about the first pivot axis. A control pedal has a second axle forming a second pivot axis, a pedal arm pivotable about the second pivot axis, and a pedal at a lower end of the pedal arm. A connecting link is pivotably connecting the pedal arm with the first booster link so that pivoting motion of the pedal arm about the second pivot axis pivots the booster link about the first pivot axis. A support member has a first end supporting the second axle on opposite sides of the pedal arm and the support member is pivotable about its second end. A drive assembly is operably connected to the control pedal to move the second axle in a fore-aft direction to adjust the control pedal in a fore-aft direction.

According to another aspect of the present invention, a control pedal system comprises, in combination, a brake pedal assembly and an accelerator pedal assembly. The brake pedal assembly includes a first axle forming a first pivot axis, and a booster link pivotable about the first pivot axis. A brake pedal has a second axle forming a second pivot axis, a pedal arm pivotable about the second pivot axis, and a pedal at a lower end of the pedal arm. A connecting link is pivotably connecting the pedal arm with the first booster link so that pivoting motion of the pedal arm about the second pivot axis pivots the booster link about the first pivot axis. A support member has a first end supporting the second axle on opposite sides of the pedal arm and the support member is pivotable about its second end. A drive assembly is operably connected to the brake pedal to move the second axle in a fore-aft direction to adjust the control pedal in a fore-aft direction. The accelerator pedal assembly comprises a fixed position support, a carrier supported by the support and moveable relative to the support in a fore-aft direction, and a lower pedal arm having a pedal at a lower end thereof. The lower pedal arm is supported by the carrier and pivotable thereto. An electronic throttle control module provides electronic signals indicating a pivotable position of the lower pedal arm relative to the carrier. A drive assembly is operably connected to carrier to move the carrier in a fore-aft direction to adjust the lower pedal arm in a fore-aft direction.

According to yet another aspect of the present invention, a control pedal system comprises, in combination, a brake pedal assembly and an accelerator pedal assembly. The brake pedal assembly includes a first axle forming a first pivot axis, and a booster link pivotable about the first pivot axis. A brake pedal has a second axle forming a second pivot axis, a pedal arm pivotable about the second pivot axis, and a pedal at a lower end of the pedal arm. A connecting link is pivotably connecting the pedal arm with the firct booster link so that pivoting motion of the pedal arm about the second pivot axis pivots the booster link about the first pivot axis. A support member has a first end supporting the second axle on opposite sides of the pedal arm and the support member is pivotable about its second end. A drive assembly is operably connected to the brake pedal to move the second axle in a fore-aft direction to adjust the control pedal in a fore-aft direction. The accelerator pedal assembly comprises a fixed position support, a carrier supported by the support and moveable relative to the support in a fore-aft direction, and a lower pedal arm having a pedal at a lower end thereof. The lower pedal arm is supported by the carrier and pivotable thereto. An electronic throttle control module provides electronic signals indicating a pivotable position of the lower pedal arm relative to the carrier. A drive assembly is operably connected to carrier to move the carrier in a fore-aft direction to adjust the lower pedal arm in a fore-aft direction. An electric motor is operably connected to the drive system of the accelerator pedal assembly so that operation of the motor adjusts the brake pedal in the fore-aft direction. A flex cable extends from the drive assembly of the accelerator pedal assembly to the drive assembly of the brake pedal assembly so that operation of the motor adjusts the lower pedal arm in the fore-aft direction.

From the foregoing disclosure and the following more detailed description of various preferred embodiments it will be apparent to those skilled in the art that the present invention provides a significant advance in the technology and art of adjustable control pedal assemblies. Particularly significant in this regard is the potential the invention affords for providing a high quality, feature-rich, low noise, low cost assembly that has low brake ratio change throughout its range of adjustment and can be used in multi-vehicle environments. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein:

FIG. 5 is a diagrammatic view of the brake adjustable pedal assembly of FIGS. 1 to 4 illustrating a brake pedal pad depressed by a driver;

FIG. 6 is a diagrammatic view of the brake adjustable pedal assembly of FIGS. 1 to 4 illustrating the brake pedal pad being adjusted in a rearward direction;

Figure 1:
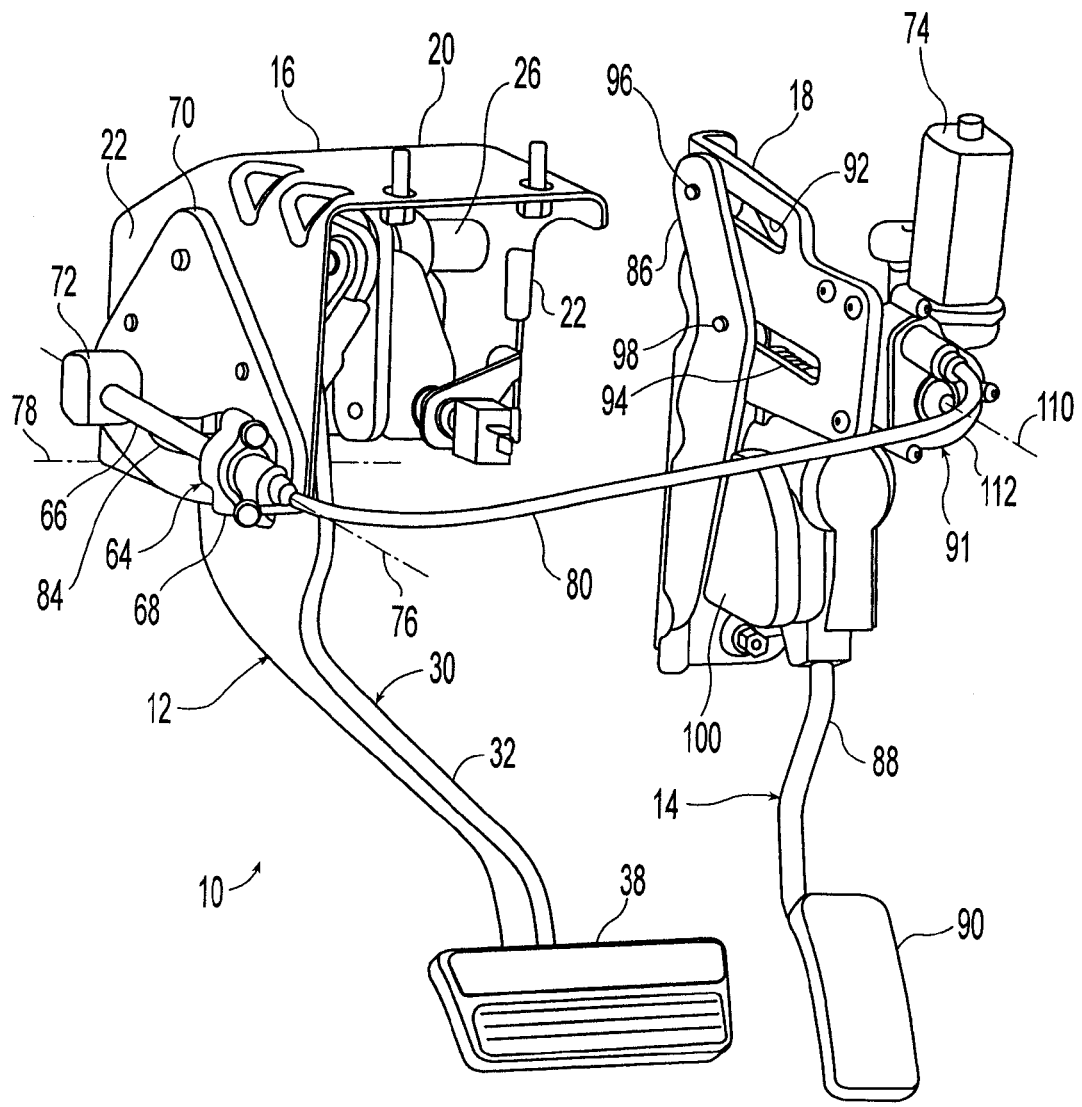
FIG. 1 is a right-rear perspective view of brake and accelerator adjustable control pedal assemblies according to the present invention.
Figure 2:
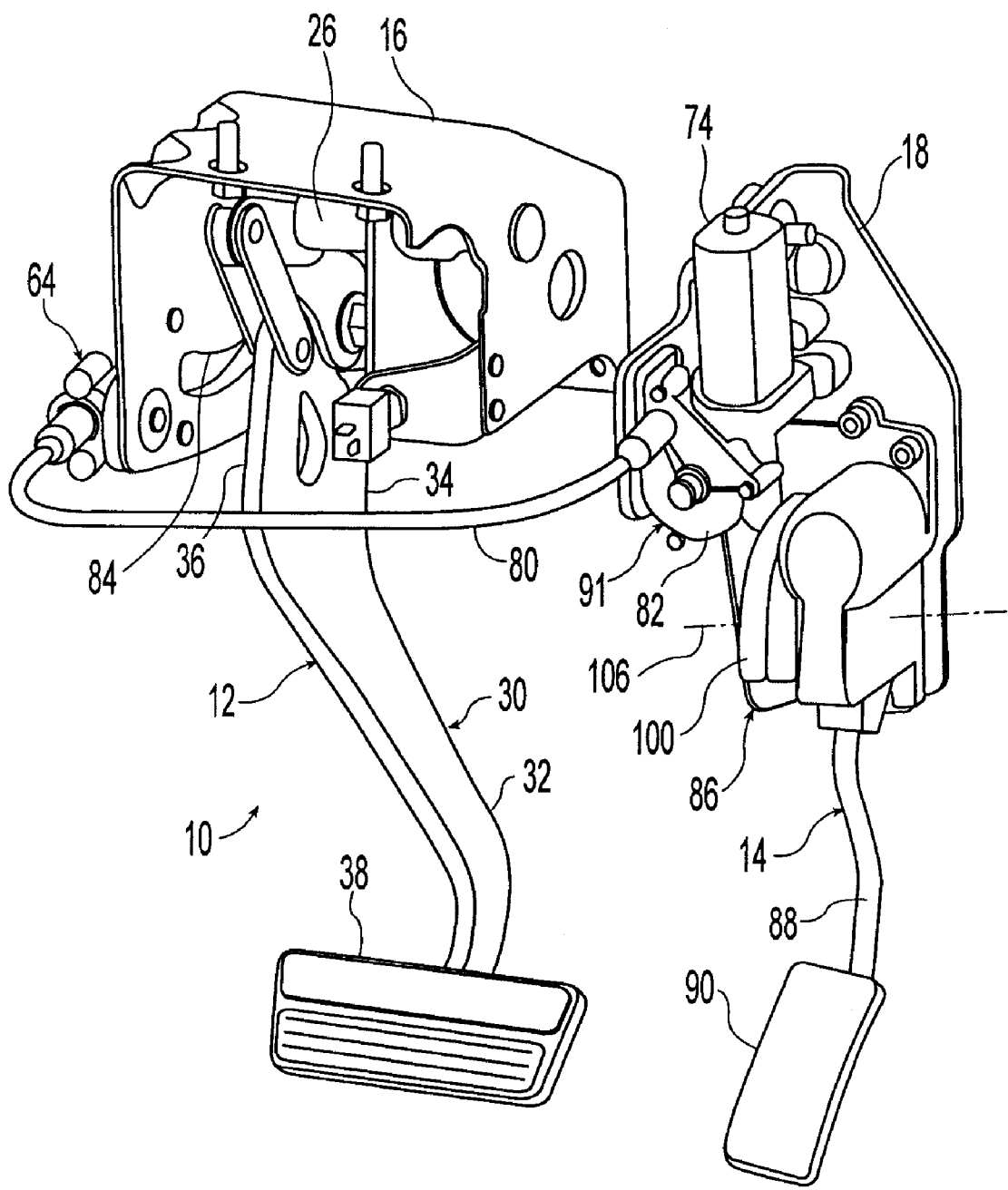
FIG. 2 is a left-rear perspective view of the adjustable control pedal assemblies of FIG. 1.
Figure 3:
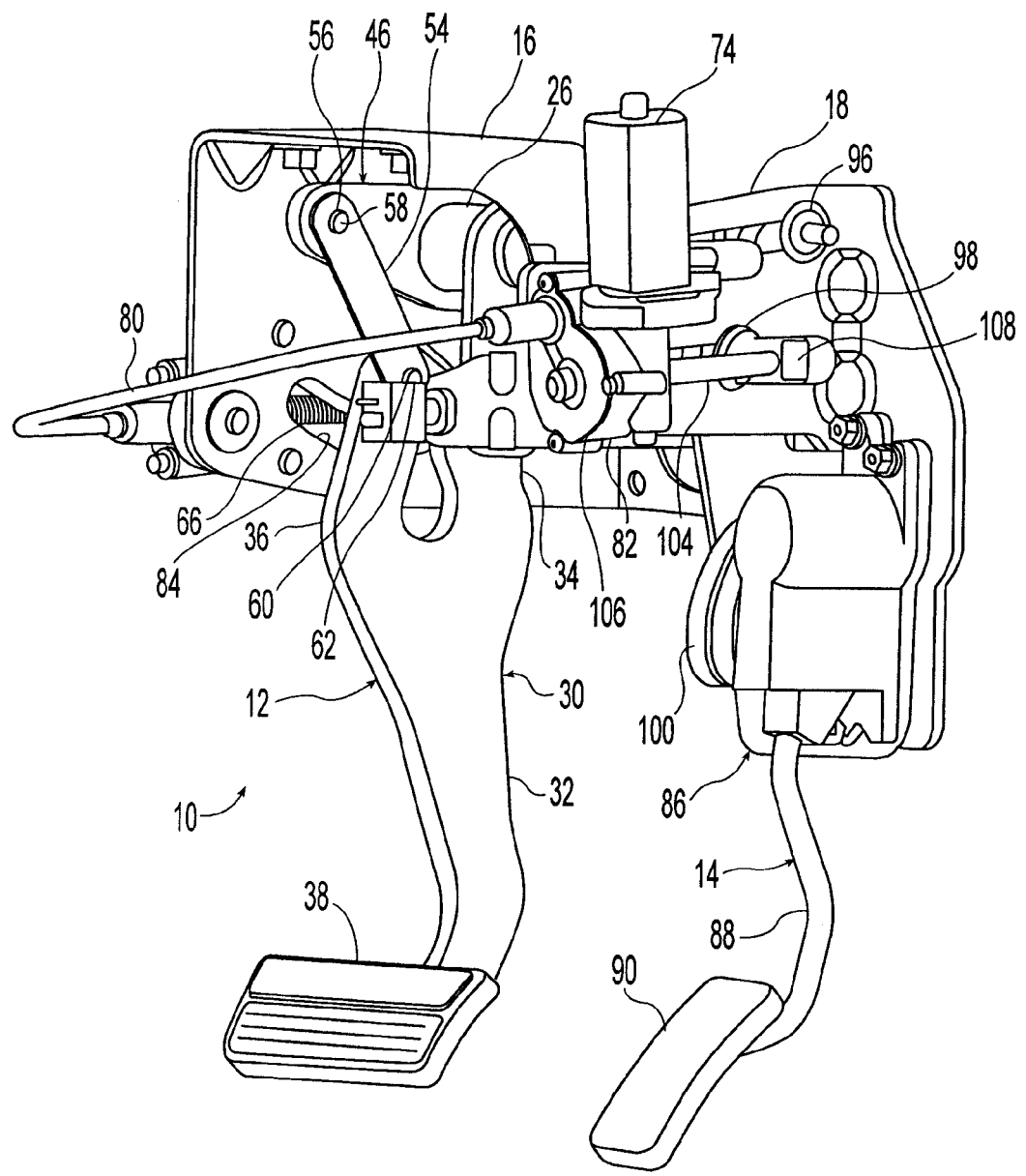
FIG. 3 is a left-rear perspective view of the adjustable control pedal assemblies of FIGS. 1 and 2.
Figure 4:
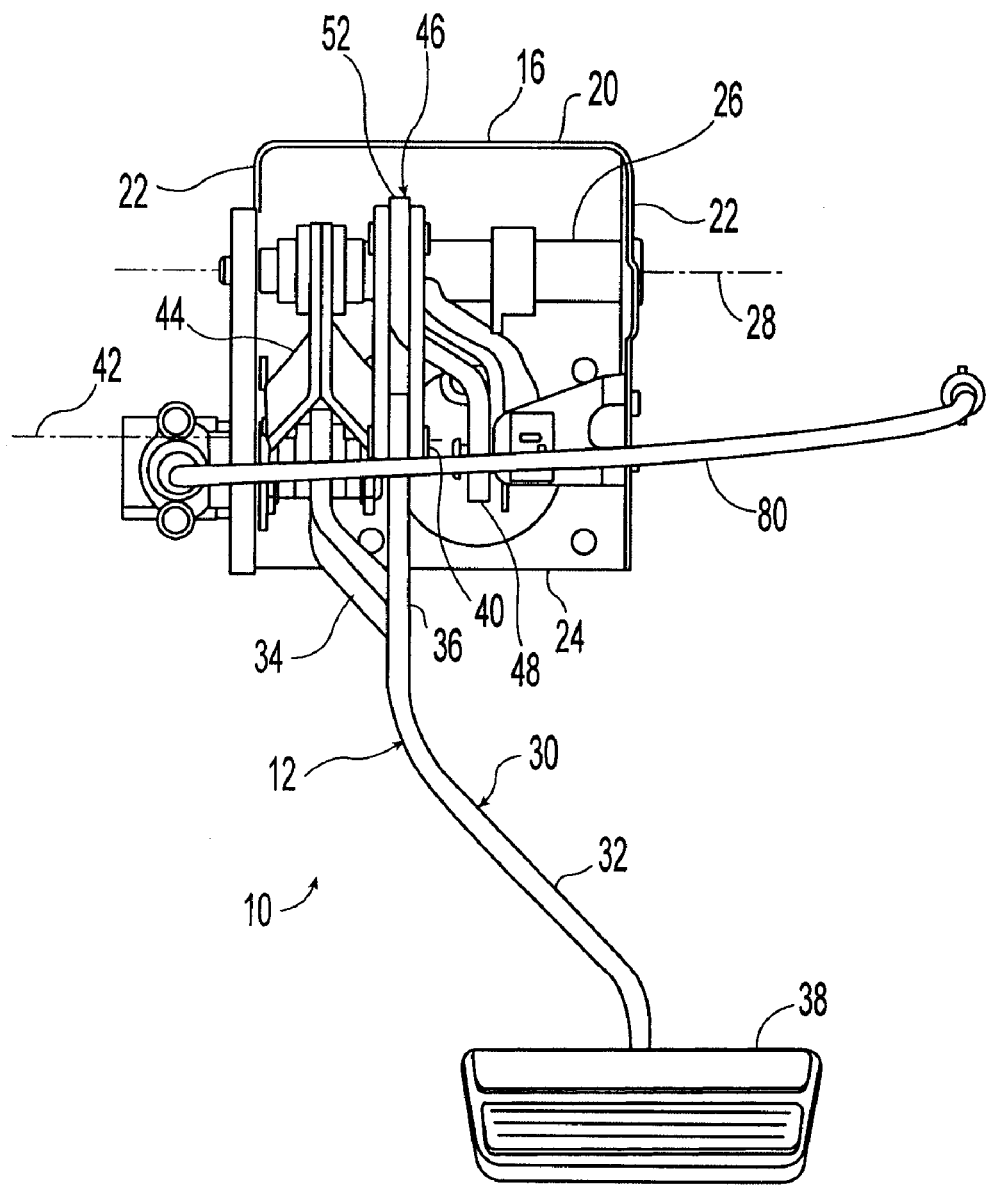
FIG. 4 is a rear elevational view similar of the brake adjustable control pedal assembly of FIGS. 1 to 3.
Figure 7:
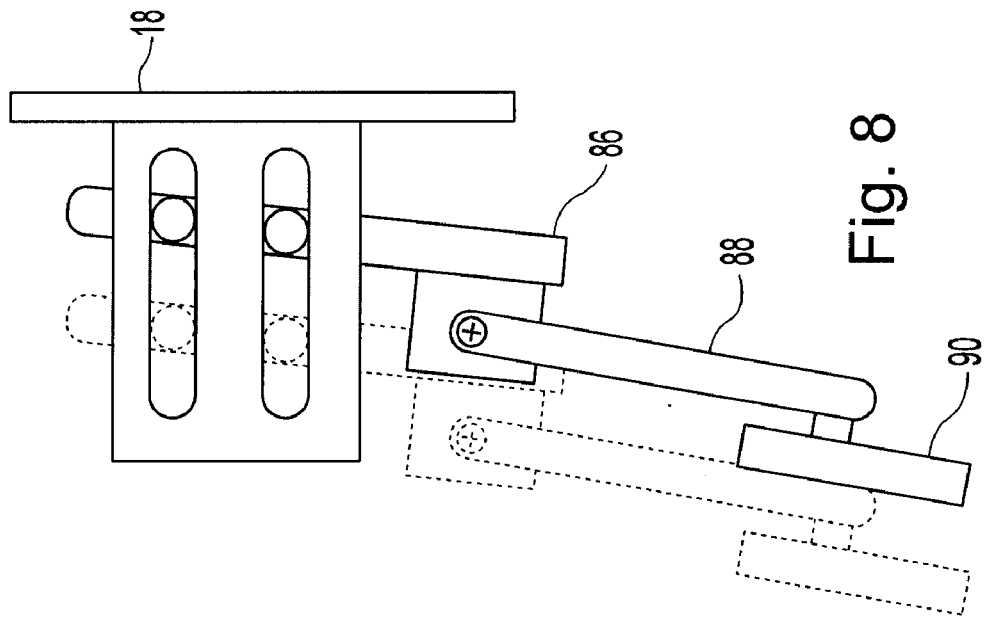
FIG. 7 is a diagrammatic view of the accelerator adjustable pedal assembly of FIGS. 1 to 3 illustrating an accelerator pedal pad depressed by a driver.
Figure 8:
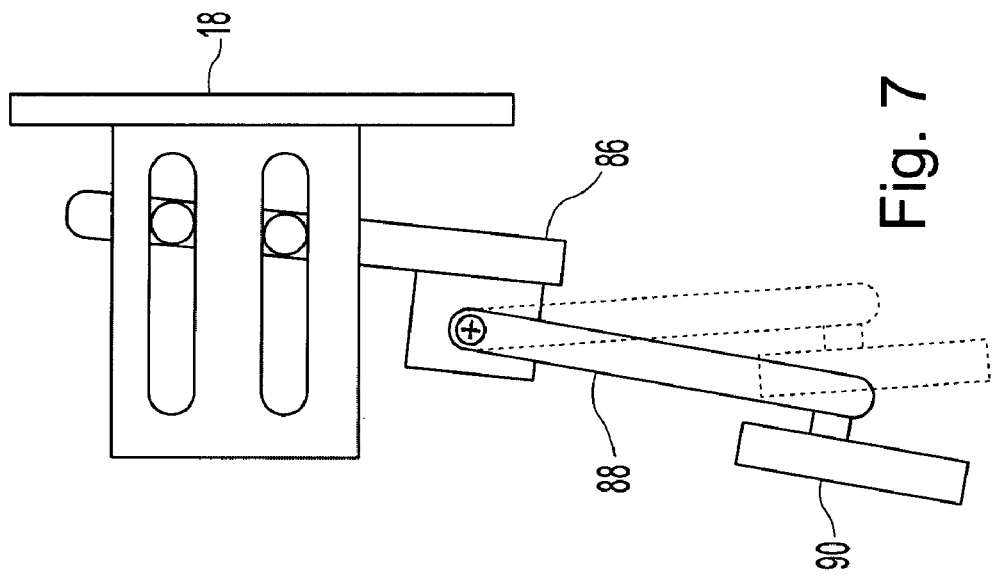
FIG. 8 is a diagrammatic view of the accelerator adjustable pedal assembly of FIGS. 1 to 3 illustrating the accelerator pedal pad being adjusted in a rearward direction.

It should be understood that the appended drawings are not necessarily to scale, presenting a somewhat simplified representation of various preferred features illustrative of the basic principles of the invention. The specific design features of a control pedal assembly as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the control pedal assembly illustrated in the drawings. In general, up or upward refers to an upward direction in the plane of the paper in FIG. 1 and down or downward refers to a down direction in the plane of the paper in FIG. 1. Also in general, fore or forward refers to a direction toward the front of the motor vehicle and aft, rear, or rearward refers to a direction toward the rear of the motor vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved control pedal assemblies disclosed herein. The following detailed discussion of various alternative and preferred embodiments will illustrate the general principles of the invention with reference to a control pedal assembly for use with a motor vehicle. Other embodiments suitable for other applications will be apparent to those skilled in the art given the benefit of this disclosure.

Referring now to the drawings, FIGS. 1 to 8 show a control pedal system 10 for a motor vehicle, such as an automobile, according to the present invention which is selectively adjustable to a desired position by a driver. While the illustrated embodiments of the present invention are particularly adapted for use with an automobile, it is noted that the present invention can be utilized with any vehicle having at least one foot operated control pedal including trucks, buses, vans, recreational vehicles, earth moving equipment and the like, off road vehicles such as dune buggies and the like, air borne vehicles, water borne vehicles, and any other suitable vehicle.

The illustrated control pedal system 10 includes a brake pedal assembly 12 and an accelerator pedal assembly 14 which are together adjustable relative to stationary or fixed-position supports or mounting brackets 16, 18. The mounting brackets are rigidly attached or secured to a firewall or other rigid structure of the motor vehicle in a known manner.

The illustrated brake mounting bracket 16 has a top wall 20, opposed side walls 22 downwardly extending from opposite lateral sides of the top wall 20, and a forward wall 24 downwardly extending from the forward edge of the top wall 20 and connecting forward edges of the side walls 22 to form a generally hollow interior space. Laterally extending between the side walls 22 is a first axle or pivot pin 26 forming a fixed-position, laterally and horizontally extending first pivot axis 28. The first axle is 26 directly supported by the brake mounting bracket 16.

The brake pedal assembly 12 includes a brake pedal or arm 30. The illustrated brake pedal 30 is generally an elongate plate oriented forward-rearward and vertical plane. The illustrated brake pedal 30 has an elongate main portion 32, a pivot portion 34 extending from the top of the main portion 32, a booster portion 36 extending from the top of the main portion 32 and a pedal portion or pad 38 at the bottom of the main portion 32. The pivot portion 34 generally upwardly extends from the top of the main portion 32. The upper end of the pivot portion 34 receives a second axle or pivot pin 40. The second axle 40 forms a horizontal and laterally extending second pivot axis 42 about which the brake arm 30 pivots. The second axle 40 is supported by a support member 44 as discussed in more detail hereinafter. The booster portion 36 generally upwardly extends from the top of the main portion 32 and is operatively connected to a booster link 46 as described in more detail hereinafter. The brake pedal portion or pad 38 is located at a lower end of the brake arm 30. The brake pad 38 is adapted for depression by the driver of the motor vehicle to pivot the brake arm 30 about the second pivot axis 42 to obtain a desired control input to the brake system of the motor vehicle. It is also noted that while the illustrated brake pad 38 is formed separate and attached to the brake arm 30, the brake pedal 38 can be formed unitary with the brake arm 30 within the scope of the present invention.

The illustrated support member 44 forms a cradle to directly support the second axle 40 and thus support the brake pedal 30. The illustrated support member 44 has a first or upper end pivotably supported by the first axle 26 and a second or lower end supporting the second axle 40 on opposite sides of the brake arm 30. Thus, the support member 44 carries and supports the second axle 40 and the brake arm 30 from the first axle 26. The illustrated support member 44 is generally "fork" shaped have a two portions 44a, 44b that are adjacent at the first end but spaced apart and the lower end to form a space therebetween for receiving the upper end of the brake arm 30 therein. The two portions 44a, 44b are preferably secured together to prevent relative motion therebetween. It is noted that while the illustrated support member 44 is formed by separate components integrally attached together, the support member 44 can alternatively be formed as a unitary, one-piece component.

The booster link 46 is pivotably mounted on the first axle 26 so that the booster link 46 is pivotable about the first pivot axis 28 formed by the first axle 26. The illustrated booster link 46 has a first portion 48 that downwardly and forwardly extends from the first axle 26 and is provided with a booster pin or other suitable connection at its lower end. The booster pin 50 is suitably connected to the vehicle brake system so that pivoting motion of the booster link 46 about the first pivot axis 28 operates the vehicle brake system in a desired manner. The illustrated booster link 46 has a second portion 52 that rearwardly extends from the first axle 26. The illustrated booster link first and second portions 48, 52 pivot together in unison about the first pivot axis 26 with no relative motion therebetween. It is noted that while the illustrated booster link first and second portions 48, 52 are formed as separate components and each rotatable with the first axle 26, they can alternatively be formed as a unitary, one-piece component within the scope of the present invention.

A brake or connecting link 54 connects the second portion 52 of the booster link 46 and the booster portion 36 of the brake arm 30. A first or upper end of the brake link 54 is pivotably attached to the rearward end of the booster link second portion 52 by a first brake link pivot or pin 56 forming a laterally and horizontally extending pivot axis 58. A second or lower end of the brake link 54 is pivotably attached to the upper end of the booster portion 36 of brake arm 30 by a second brake link pivot or pin 60 forming a laterally and horizontally extending pivot axis 62. Connected in this manner, pivotable motion of the brake arm 30 about the second pivot axis 42 is transferred to the booster link 46 through the brake link 54 so that the booster link 46 pivots about the first pivot axis 26 in response to the motion of the brake arm 30. It is noted that the illustrated brake link is comprised of two separate portions located on opposite sides of the booster link 46 and the brake arm 30.

An illustrated drive assembly 64 includes a drive or lead screw 66, a lead screw housing or attachment 68 securing the lead screw 66 to a support 70 secured to the side wall 22 of the mounting bracket 16, a drive nut or block 72 which is adapted for linear longitudinal movement along the lead screw 66 in response to rotation of the lead screw 66, and an electric motor 74 for rotating the lead screw 66. The lead screw 66 is an elongate shaft having a threaded portion adapted for cooperation with the drive nut 72. The lead screw 66 is preferably formed of resin such as, for example, NYLON but can be alternately formed of a metal such as, for example, steel. The rearward end of the lead screw 66 is provided with a bearing surface which cooperates with the lead screw housing 68 to support the lead screw 66 and to attach the lead screw 66 to the support 70. The lead screw 66 is supported for rotation about a central longitudinal axis 76 of rotation of the lead screw 66. The lead screw housing 68 is pivotably attached to the support 70 about a laterally extending pivot axis 78.

The illustrated motor 74 is located at the accelerator pedal assembly 14 and is coupled to the lead screw via a flexible cable 80 in a known manner. The lead screw 66 is thus connected to an output shaft of the motor 74. It is noted that suitable gearing 82 can be provided between the motor 72 and the lead screw 66 as necessary depending on the requirements of the system 10. It is also noted that the motor 74 can alternatively be located at the brake pedal assembly 12 and/or the brake and accelerator pedal assemblies 12, 14 can have separate motors. The drive motor 74 is preferably connected to a suitable control circuit having operator input devices for selectively operating the motor to position the pedal assemblies 12, 14 in desired positions.

The drive nut 72 has a threaded opening sized and shaped to cooperate with the lead screw 66 so that the drive nut linearly moves along the length of the lead screw 66 in response to rotation of the lead screw 66 by the motor 74. The drive nut 72 is preferably molded of a suitable plastic material such as, for example, NYLON but can alternatively be formed of metal such as, for example steel. The illustrated drive nut 72 is operably connected to the second axle 40 such that the drive nut 72 moves the second axle 40 as the drive nut 72 moves along the lead screw 66 in response to rotation of the lead screw 66. It is noted that the second axle 40 and the drive nut 72 can be formed unitary or as separate components rigidly secured together. As the drive nut 72 moves along the lead screw 66, the second axle 40 moves along an arc-shaped path formed by the pivoting motion of the support member 44 about the first pivot axis 26. Formed in the support 70 and the mounting bracket 16 are slots 84 generally extending in the forward rearward direction. The illustrated slots 84 is generally arcuate or curved in a downwardly concave manner, that is, the center of curvature is located above the slots 84. The illustrated slots 84 are sized and shaped to provide a clearance opening for the connection between the drive nut 72 and the second axle 40. It is noted that other suitable configurations and/or orientations of the slots 84 can be utilized within the scope of the present invention such as, for example, the slots 84 could be straight, horizontal, and/or any other suitable shape or orientation.

The drive assembly 64 is preferably provided with self-aligning joints to promote smooth motion and prevent binding. In the illustrated embodiment, the drive nut 72 is free to pivot relative to the second axle 40 about the second pivot axis 42 and the lead screw housing 68 is free to pivot relative to the support 70 about its pivot axis 78. It is noted that alternatively other suitable self-aligning joints can be utilized and in some embodiments may not be needed such as those embodiments having a straight slot. It is also noted that any other suitable type of drive assembly 64 can be utilized to move the second axle 40 in the desired manner.

The illustrated second axle 40 is supported by the support member 44 on both sides of the brake arm 30. It is noted, however, that alternatively the support member 44 can support the second axle 40 on only the side of the brake arm 30 opposite the drive assembly 64 and the other side of the second axle 40 is supported by a guide closely received in the slot 64. Such a guide/slot supporting connection is disclosed in detail in U.S. patent application Ser. No. 10/462,109, the disclosure of which is expressly incorporated herein in its entirety by reference.

The accelerator pedal assembly 14 can be of any suitable type. A suitable accelerator pedal assembly 14 is described in detail in U.S. Pat. No. 6,367,348, the disclosure of which is expressly incorporated herein in its entirety by reference. The illustrated accelerator pedal assembly 14 is an electronic throttle control (ETC) type accelerator pedal assembly. The forward/rearward adjustment is obtained between the mounting bracket 18 and an upper pedal arm or carrier 86 and a lower pedal arm 88 is pivotably attached to the upper pedal arm or carrier 86.

The accelerator pedal assembly 14 includes the mounting bracket 18, the carrier 86 supported by the mounting bracket 18, the lower pedal arm 88 supported by the carrier 86 and carrying a pedal or pad 90 for engagement by the foot of the motor vehicle operator, and a drive assembly 91 for moving the carrier 86 relative to the mounting bracket 18 to adjust the forward/rearward position of the pedal 90.

The carrier 86 is adapted for fore/aft movement relative to the mounting bracket 18. The illustrated mounting bracket 18 has the pair of vertically spaced apart and parallel slots 92, 94 formed therein which generally extend in a forward/rearward direction along the length of the mounting bracket 18. The illustrated slots 92, 94 are each substantially straight and horizontal. Preferably, the lower slot 94 is offset rearward of the upper slot 92 but overlapping the upper slot 92. The slots 92, 94 are sized and shaped for cooperation with the carrier 86 for substantially linear forward/rearward movement of the pedal 16 relative the mounting bracket 20 over a desired adjustment range, such as about three inches, as described in more detail hereinbelow.

The carrier 86 is adapted for linear movement relative to mounting bracket 18 along the slots 92, 94. The upper end of the carrier 86 is provided with guide and drive pins 96, 98 laterally and horizontally extending therefrom to cooperate with the slots 92, 94 of the mounting bracket 18 to form sliding pin and slot connections for linearly moving the carrier 86 relative to the mounting bracket 18.

The upper end of the lower pedal arm 88 is pivotably mounted to the carrier 86 by an electronic throttle control module ("ETC module") 100. The lower pedal arm 88 is pivotable relative to the upper pedal arm or carrier 86 about a horizontally and laterally extending pivot axis 102 formed by the ETC module 100. The lower end of the lower pedal arm 88 is sized and shaped to carry the rearward-facing pedal 90. The pedal 90 is adapted for depression by the driver of the motor vehicle to pivot the lower pedal arm 88 about the pivot axis 102 to obtain a desired control input to the motor vehicle.

The lower pedal arm 88 is operatively connected to a control device such as a motor vehicle throttle such that pivotal movement of the lower pedal arm 88 about the pivot axis 102 operates the control device in a desired manner. The illustrated lower pedal arm 88 is connected to the control device by the ETC module 100 for electronic actuation. The ETC module 100 senses pivotable movement of the lower pedal arm 88 and sends electronic signals regarding such via a electric cable or wire connected thereto. The electronic throttle control module 100 can be of any suitable type known in the art.

The illustrated drive assembly 91 includes a drive or lead screw 104, a lead screw housing or attachment 106 securing the lead screw 104 to the mounting bracket 18, a drive nut or block 108 which is adapted for linear longitudinal movement along the lead screw 104 in response to rotation of the lead screw 104, and the electric motor 74 for rotating the lead screw 104. The lead screw 14 is an elongate shaft having a threaded portion adapted for cooperation with the drive nut 108. The lead screw 104 is preferably formed of resin such as, for example, NYLON but can be alternately formed of a metal such as, for example, steel. The rearward end of the lead screw 66 is supported by the housing 106 which attaches the lead screw 104 to the mounting bracket 18 adjacent the lower slot 94. The lead screw 104 is supported for rotation about a central longitudinal axis 110 of rotation of the lead screw 104. The illustrated motor 74 is located is directly coupled to the lead screw 104 via suitable gearing 112 in a known manner. The lead screw 104 is thus connected to an output shaft of the motor 74. The drive motor 74 is preferably connected to a suitable control circuit having operator input devices for selectively operating the motor to position the pedal assemblies 12, 14 in desired positions.

The drive nut 108 has a threaded opening sized and shaped to cooperate with the lead screw 104 so that the drive nut 108 linearly moves along the length of the lead screw 104 in response to rotation of the lead screw 104 by the motor 74. The drive nut 108 is preferably molded of a suitable plastic material such as, for example, NYLON but can alternatively be formed of metal such as, for example steel. The illustrated drive nut 108 is operably connected to the drive pin 98 of the carrier 86 such that the drive nut 108 moves the drive pin 98 as the drive nut 108 moves along the lead screw 104 in response to rotation of the lead screw 104. It is noted that the drive pin 98 and the drive nut 108 can be formed unitary or as separate components rigidly secured together. As the drive nut 108 moves along the lead screw 104, the drive pin 98 moves along the lower slot 94 of the mounting bracket 18.

The position of the brake and accelerator pedal assemblies 12, 14 can be adjusted by the operator of the motor vehicle in a forward-rearward direction between a full rearward position and a full forward position. The pedal assemblies 12, 14 can be infinitely positioned at any desired position between these end point positions. To adjust the forward/rearward position, the driver engages a control switch which activates rotation of the motor 74 in the desired direction. Rotation of the motor 74 rotates the drive screw 104 through the gearing 112 and causes the drive nut 108 to axially move along the drive screw 104 in the desired direction. The drive nut 108 moves along the drive screw 104 because the drive nut 108 is held against rotation with the drive screw 104 by the drive pin 98. As the drive nut 108 axially moves along the drive screw 104, the drive pin 98 moves along the lower slot 94 because the drive pin 98 is secured to the drive nut 108. It is noted that binding of the drive nut 108 along the drive screw 104 is minimized if a self-aligning joint is provided, between the drive screw 104 and the drive screw housing 106 and/or the drive nut 108 and the drive pin 98, to automatically align the components so that the drive nut 108 can smoothly travel along the drive screw 106. As the drive pin 98 slidingly moves along the lower slot 94, the carrier 86 is moved therewith to adjust the forward/rearward position of the pedal 90. As the carrier 86 moves, the guide pin 96 slides along the upper slot 92. With such movement, the pedal 90 travels in a substantially linear and horizontal path, that is, the pedal 90 moves in a forward/rearward direction and generally remains at the same height relative to the fixed mounting bracket 18 during adjustment of the pedal 90. Additionally, the pedal 90 is not rotated as the carrier 86 moves so that the orientation of the pedal 90 does not change. It can be seen from the above description that activation of the motor 74 changes the position of the carrier 86 and the lower pedal arm 88 relative to the mounting bracket 18 but not the position of the carrier 86 relative to the lower pedal arm 88 and therefore does not affect the rotational sensing of the ETC module 100.

Rotation of the motor 74 also rotates the lead screw 66 about its axis of rotation 76 via the flex cable 80 in a direction which causes the drive block 72 to linearly move along the lead screw 66. The movement of the drive block 72 causes the support member 44 to pivot about the first axle 26. As the support member 44 pivots and moves the brake arm 30, the brake link 54 pivots about its pivot axes 58, 62. It is noted that the booster link 46 and the booster pin do not move during this position adjustment so that operation of the vehicle brake system is not affected. It is noted that the motor 74 can be stopped at any time to locate the pedals 12, 14 at any intermediate position. To return the pedals 12, 14 to the previous position, the motor 74 rotates the lead screws 66, 104 in the opposite direction to move the components in the opposite direction as described above.

To activate the vehicle brakes, the operator depresses the brake pedal pad 38 during operation of the motor vehicle. When a force is applied to the lower end of the brake arm 30, the brake arm 30 pivots about the second pivot axis 42. The pivoting motion of the brake arm 30 downwardly pulls the brake link 54 which in turn downwardly pulls the rearward end of the booster link second portion 52. The pivoting action of the booster link second portion 52 pivots the booster link first portion 48 and moves the booster pin to operate the vehicle brake system. When the force is removed from the lower end of the brake arm 30, a return spring provided in the brake system resiliently pivots the booster link 46 back which pulls the brake link 54 up and pivots the brake arm 30 back to its undepressed position. It is noted that alternatively or additionally a return spring can be provided in the pedal assembly 12 which resiliently returns the brake pedal arm 30 to the undepressed position when the force is removed.

To accelerate the vehicle, the operator depresses the accelerator pedal 90 during operation of the motor vehicle to engage the throttle system of the motor vehicle. When a force is applied to the lower end of the accelerator lower arm 88, the accelerator lower arm 88 pivots about the pivot axis 102. The pivoting motion of the accelerator lower arm 88 is sensed by the ETC module 100 and the ETC module 100 sends an electronic signal to the throttle system brake system. When the force is removed from the lower end of the accelerator lower arm 88, a return spring of the accelerator pedal assembly 14 resiliently pivots the accelerator lower arm 88 back to its undepressed position.

From the foregoing disclosure it will be apparent that the present invention provides an adjustable pedal system 10 that provides a substantially constant brake ratio throughout the forward/rearward adjustment so that the brake pedal maintains its desired feel throughout the range of adjustment. It is also apparent that the adjustable pedal system is easily customized to meet varying vehicle or floor pan requirements because the brake accelerator assemblies are connected by only a flex cable or nothing if the flex cable is eliminated. The present invention utilizes a single drive system having a single motor 74 and a flex cable 80 that does not externally move during position adjustment or depression of either of the pedals to reduce overall operating noise and increase overall reliability. Note that the lead screws 66, 104 and the flex cable 80 attached thereto are secured to the fixed mounting brackets 16, 18 and do not change position during any operation.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the control pedal assembly can at least partly be operated from a remote control unit such as a keyless entry device. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A control pedal assembly comprising, in combination:
   a first axle forming a first pivot axis;
   a booster link which pivots about the first pivot axis;
   a second pivot axle forming a second pivot axis;
   a control pedal having a pedal arm which pivots about the second pivot axis upon depression by an operator, and a pedal pad at a lower end of the pedal arm;
   a connecting link pivotably connecting an upper end of the pedal arm with the first booster link so that pivoting motion of the pedal arm about the second pivot axis pivots the booster link about the first pivot axis; and
   a support member having an upper end which pivots about the first pivot axis and a lower end supporting the second axle from the first axle;
   a drive assembly operably connected to the control pedal to move the second axle in a fore-aft direction to adjust the control pedal pad in a fore-aft direction.

2. The control pedal assembly according to claim 1, wherein the first and second pivot axes are parallel and spaced apart.

3. The control pedal assembly according to claim 1, wherein the drive assembly moves the second axle along an arc-shaped path defined by the pivoting motion of the support member about the first pivot axis.

4. The control pedal assembly according to claim 1, wherein the lower end of the support member supports the second axle from the first axle on opposite sides of the pedal arm.

5. The control pedal assembly according to claim 1, wherein the support member hangs from the first axle to form a cradle directly supporting the second axle.

6. The control pedal assembly according to claim 1, further comprising a fixed position support supporting the first axle at a fixed position.

7. The control pedal assembly according to claim 6, wherein the drive assembly extends through an arcuate slot formed in the support.

8. The control pedal assembly according to claim 7, wherein the slot is defined by an arc-shaped path defined by the pivoting motion of the support member about the first pivot axis.

9. The control pedal assembly according to claim 1, wherein depression of the pedal pad pivots the first pedal arm about the second pivot axis.

10. The control pedal assembly according to claim 1, wherein the control pedal assembly provides a constant brake ratio throughout the fore-aft adjustment.

11. A control pedal system comprising, in combination:
    a brake pedal assembly comprising:
    a first axle forming a first pivot axis;
    a booster link which pivots about the first pivot axis;
    a second pivot axle forming a second pivot axis;

a brake pedal having a pedal arm which pivots about the second pivot axis upon depression by an operator, and a brake pedal pad at a lower end of the pedal arm;

a connecting link pivotably connecting an upper end of the pedal arm with the booster link so that pivoting motion of the pedal arm about the second pivot axis pivots the booster link about the first pivot axis;

a support member having an upper end which pivots about the first pivot axis and a lower end supporting the second axle from the first axle; and a brake drive assembly operably connected to the brake pedal to move the second axle in a fore-aft direction to adjust the brake pedal pad in a fore-aft direction; and an accelerator pedal assembly comprising:

an accelerator fixed position support;

a carrier supported by the accelerator fixed position support and which selectively moves relative to the accelerator fixed position support in a fore-aft direction;

a lower pedal arm having an accelerator pedal pad at a lower end thereof; wherein the lower pedal arm is supported by the carrier and pivots relative to the carrier;

an electronic throttle control module providing electronic signals indicating a pivotable position of the lower pedal arm relative to the carrier; and an accelerator drive assembly operably connected to carrier to move the carrier in a fore-aft direction to adjust the accelerator pedal pad in a fore-aft direction.

12. The control pedal system according to claim 11, wherein the first and second pivot axes are parallel and spaced apart.

13. The control pedal system according to claim 11, wherein the drive assembly moves the second axle along an arc-shaped path defined by the pivoting motion of the support member about the first pivot axis.

14. The control pedal system according to claim 11, wherein the lower end of the support member supports the second axle from the first axle on opposite sides of the pedal arm.

15. The control pedal system according to claim 11, wherein the support member hangs from the first axle to form a cradle directly supporting the second axle.

16. The control pedal system according to claim 11, further comprising a brake fixed position support supporting the first axle at a fixed position.

17. The control pedal system according to claim 11, wherein depression of the brake pedal pad pivots the pedal arm about the second pivot axis.

18. The control pedal system according to claim 11, wherein the brake pedal assembly provides a constant brake ratio throughout the fore-aft adjustment.

19. A control pedal system comprising, in combination:

a brake pedal assembly comprising:

a first axle forming a first pivot axis;

a brake fixed position support supporting the first axle at a fixed position;

a booster link which pivots about the first pivot axis;

a second pivot axle forming a second pivot axis;

a brake pedal having a pedal arm which pivots about the second pivot axis upon depression by an operator, and a brake pedal pad at a lower end of the pedal arm;

a connecting link pivotably connecting an upper end of the pedal arm with the booster link so that pivoting motion of the pedal arm about the second pivot axis pivots the booster link about the first pivot axis;

a support member having an upper end which pivots about the first pivot axis and a lower end supporting the second axle from the first axle on opposite sides of the pedal arm; and a brake drive assembly operably connected to the brake pedal to move the second axle in a fore-aft direction to adjust the brake pedal pad in a fore-aft direction;

an accelerator pedal assembly comprising:

an accelerator fixed position support;

a carrier supported by the accelerator fixed position support and which selectively moves relative to the accelerator fixed position support in a fore-aft direction;

a lower pedal arm having an accelerator pedal pad at a lower end thereof;

wherein the lower pedal arm is supported by the carrier and pivots relative to the carrier;

an electronic throttle control module providing electronic signals indicating a pivotable position of the lower pedal arm relative to the carrier; and an accelerator drive assembly operably connected to carrier to move the carrier in a fore-aft direction to adjust the accelerator pedal pad in a fore-aft direction;

an electric motor operably connected to the accelerator drive system so that operation of the motor adjusts the accelerator pedal pad in the fore-aft direction;

a flex cable extending from the accelerator drive assembly to the brake drive assembly so that operation of the motor adjusts the brake pedal pad in the fore-aft direction.

20. The control pedal system according to claim 19, wherein ends of the flex cable are secured to the brake fixed position support and the accelerator fixed position support so that the ends of the flex cable do not move during operation and adjustment of the brake pedal assembly and operation and adjustment of the accelerator pedal assembly.

* * * * *